Patented Apr. 20, 1948

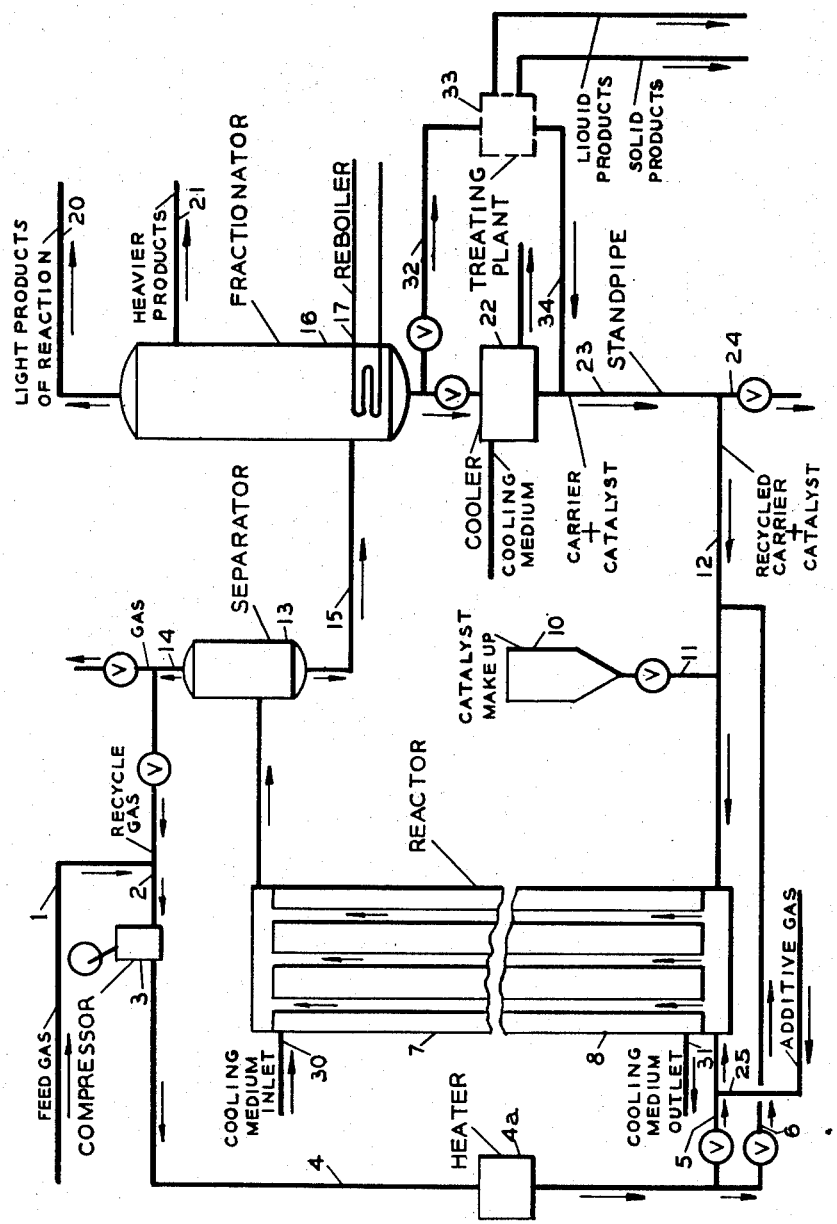

2,440,109

UNITED STATES PATENT OFFICE 2,440,109

METHOD OF EFFECTING CATALYTIC REACTIONS

Frank J. Moore, Beacon, N. Y., assignor, by mesne assignments, to The Texas Company, New York, N. Y., a corporation of Delaware Application February 6, 1945, Serial No. 576,472

6 Claims. (Cl. 260—449.6)

This invention relates to a method of effecting catalytic reactions and more particularly to a method of effecting catalytic conversion of gaseous reactants by the action of a solid catalyst suspended in a carrier liquid.

The present application is a continuation-in-part of my now forfeited co-pending application, Serial No. 496,020, filed July 24, 1943, for Method of effecting catalytic reactions.

The invention contemplates a continuous process wherein the solid catalyst in finely divided form is suspended in a suitable carrier liquid and then the gas reactants are dispersed or injected in the suspension so as to cause displacement of the suspension as well as gaseous reactants through a reaction zone wherein catalytic conversion of the reactants is effected. The effluent mixture of carrier liquid, suspended catalyst and products of the reaction including any unreacted material is passed through a separating zone wherein the carrier liquid and catalyst is removed from the products of reaction and thereafter recycled through the reaction zone.

The method of this invention has application to reactions of an exothermic nature wherein it is desired to remove heat liberated in the reaction as, for example, in the case of hydrogenating carbon monoxide to produce either hydrocarbons, oxygenated compounds, or both, having two or more carbon atoms per molecule.

In order to illustrate the invention, reference will now be made to the accompanying drawing comprising a diagram of flow for effecting catalytic hydrogenation of carbon monoxide to produce hydrocarbons having two or more carbon atoms per molecule.

Referring to the drawing, a mixture of carbon monoxide and hydrogen in the proportion of about 1 mol of carbon monoxide to 2 mols of hydrogen or in whatever proportion desired for effecting the reaction is conducted from a source not shown through a pipe 1 communicating with a pipe 2.

The pipe 2 leads to a compressor 3 which discharges into a pipe 4 communicating with branch pipes 5 and 6. Advantageously a heater 4a is interposed in the pipe 4 for heating the feed gas to the reaction temperature.

Branch pipe 5 communicates with the lower portion of a reactor 7.

The reactor 7 may comprise a single reaction tube or, as indicated in the drawing, may comprise a plurality of reaction tubes 8 arranged as a tubular bundle within a shell after the fashion of a heat exchanger. Tubular reactors 8 may thus be surrounded with a cooling liquid so as to remove the exothermic heat of the reaction.

It is advantageous to employ a vertical tubular reactor having a cross-sectional area relatively small compared to the height of the reactor. For example, the reactor tubes may range in height from about 10 to 40 feet and have an inside diameter ranging from about 1 to 6 inches.

The catalyst in powdered form is introduced to the system from a hopper 10 through a valve controlled conduit 11 which communicates with a conduit 12 to which reference will be made later.

A carrier liquid such as the higher boiling portion of the products of reaction is maintained flowing through the conduit 12 so that powdered catalyst is suspended in this flowing stream passing to the bottom portion of the reactor 7.

The standpipe 23 communicates with the originally mentioned pipe 12 and in this way the recovered carrier liquid and catalyst is continuously recycled to the reactor 7.

The standpipe 23 is of sufficient height to provide a substantially static head of liquid sufficient to displace the mixture of catalyst suspension and reactant gases upwardly through the tubular recesses 8. The carbon monoxide and hydrogen are injected into the fluid mixture rising through the reaction tubes so as to form slugs or vapor therein and thus create a difference in specific gravity between the fluid in the reaction tubes 8 and the standpipe 23 thereby causing the fluid mixture to be gas-lifted through the reaction tubes. The injection of gas should be sufficient to maintain a gas flow upwardly through the tubes such that the flooding velocity is exceeded.

To facilitate maintaining the proper velocity of flow, additive or diluent gases may be added from a source not shown through a pipe 25, or gaseous constituents of the effluent product stream may be recycled. For example, a normally gaseous olefin such as propylene may be injected through the pipe 25 in which case a portion of the olefin may enter into the conversion reaction or undergo conversion in part during passage through the reaction tubes.

The amount of catalyst injected from the hopper 10 is usually just sufficient to provide make-up to compensate for catalyst disappearance from the system including spent catalyst which may be drawn off as for example through pipe 24.

In the bottom portion of the reactor 7, the feed gas, carbon monoxide and hydrogen is dispersed in the suspension of catalyst in carrier liquid.

The resulting fluid mixture comprising carrier liquid, suspended catalyst powder and bubbles of reactant gas rises through the tubular reactors 8 and overflows from the top of the reactor into a separating vessel 13, wherein gaseous constituents of the mixture, such as unconverted carbon monoxide and hydrogen, are separated and removed through a pipe 14. These separated gases may be passed all or in part through the pipe 12 for recycling through the reaction zone.

The liquid portion of the overflow accumulating in the separator 13 is continuously drawn off through a pipe 15 to a fractionator 16.

The fractionator 16 may be provided with a reboiler 17, as indicated, and is operated so as to separate from the carrier liquid and catalyst the products of reaction. These products may be separated into light and heavier fractions. For example, a fraction comprising the lighter products of reaction is drawn off as a distillate through a pipe 20 while a heavier fraction may be removed as a side stream through a pipe 21. Any number of side streams may be drawn off.

The residual liquid mixture accumulating in the bottom of the fractionator 16 comprises carrier liquid and catalyst powder suspended therein. This mixture is continuously drawn off and advantageously passed through a cooler 22 from which it passes into a standpipe 23.

As indicated in the drawing, cooling liquid may be introduced through a pipe 30 to the upper portion of the shell surrounding the reaction tubes. This liquid is continuously withdrawn from the bottom of the shell through an outlet pipe 31.

In carrying out the hydrogenation of carbon monoxide the feed gas may be heated in the heater 4a to a temperature in the range about 375 to 450° F. prior to introduction to the bottom of the reactor 7. A small part of the gas may be by-passed through the pipe 6 for the purpose of facilitating suspension of make-up catalyst in the conduit 12.

The reaction may be carried out under a pressure ranging from atmospheric to 100 pounds per square inch gauge. Higher pressures may be used, particularly where it is desired to carry out the reaction under conditions so as to produce oxygenated products of reaction such as alcohols, aldehydes, etc.

Any suitable catalyst may be employed which will function to aid the reaction between the hydrogen and oxides of carbon at the operating temperatures and pressures. Suitable catalysts are, for example, cerium, chromium, cobalt, manganese, osmium, palladium, titanium, zinc, iron and oxides or other compounds of these metals. Mixtures of these catalysts may be employed or suitable carrier material such as kieselguhr, fuller's earth and the like may be impregnated with the catalyst. The catalysts are in powdered form and preferably have a mesh between 200 and 400.

The carrier liquid in which the powdered catalyst is suspended may be substantially non-vaporizable under the reaction temperature and pressure conditions prevailing within the reaction zone. On the other hand, it is contemplated that the carrier liquid may, if desired, be at least partially vaporizable under these conditions so as to thus obtain a refrigerative effect.

It is advantageous, however, to employ a carrier liquid which is higher boiling than the products of reaction or at least the bulk of the products of reaction. Examples of carrier liquids are oxygenated organic compounds such as alcohols, ethers and esters containing 20 carbon atoms per molecule. Petroleum hydrocarbons such as heavy lubricating oils may be used, preferably the carrier liquid is a material which is substantially inert under the conditions prevailing within the reaction zone.

An important advantage of the invention resides in effecting the reaction under conditions which facilitate obtaining rapid removal of the heat liberated in reactions of highly exothermic nature. The fluid mixture of carrier liquid catalyst and reaction products contains a large amount of liquid which acts as a heat carrier and heat is readily transferred from this liquid to the walls of the reactor tubes from which the heat is removed in the cooling medium surrounding the tubes.

Another advantage resides in the avoidance of circulating pumps for circulating the catalyst suspension since the entering gaseous reactants are utilized for supplying the lifting effect within the reaction tubes to thereby cause movement of the reaction mixture through the tubes by gravity displacement.

Turbulent conditions of flow may be maintained within the tubular reactors. Thus, the reactant and recycled gas may be injected into the suspension under conditions effective to cause the stream of suspension and dispersed gas to rise through the tubular reactors in tubular flow, thereby assuring efficient contact between suspended catalyst and gaseous reactants.

During continued operation, solid or waxy material may accumulate upon the catalyst to a substantial extent, and it is therefore contemplated that provision may be made for removing this material from the system or from the catalyst.

Thus, the residual liquid mixture accumulating in the bottom of the fractionator 16 may be drawn off, all or in part, and passed through an auxiliary treating system adapted for effecting removal of accumulated waxy material or other solids. The residual liquid can be drawn off in small proportion and so treated, following which treatment the resulting catalyst or catalyst suspension freed from wax or other solid material is returned to the system.

As indicated in the drawing, the residual liquid may be drawn off through a pipe 32 to a suitable treating unit 33 which is merely indicated in diagrammatic fashion. In this treating operation, the withdrawn residual liquid mixture may be subjected to destructive hydrogenation at a temperature in the range about 400 to 800° F. and under pressures ranging from atmospheric to 100 pounds so as to convert the waxy or solid material to liquid compounds. The resulting hydrogenated mixture may then be subjected to flashing or stripping so as to remove the products of hydrogenation leaving a residue containing the catalyst which is recycled, for example, through pipe 34 to the stand pipe 23, or which may be reintroduced to the system at some other point.

An alternative procedure involves subjecting the mixture withdrawn through the pipe 32 to filtration so as to separate the catalyst and adsorbed matter as a filter cake. This filter cake can be treated with hydrogen at temperatures in the range 400 to 800° F. so as to remove the adsorbed waxy material according to conventional methods. The filtrate can be subjected to solvent dewaxing so as to remove solidifiable constituents therefrom.

The dewaxed filtrate or a suitable portion thereof can be used as carrier for the recovered catalyst. The recovered catalyst suspended in the carrier liquid is then returned to the system.

Accordingly, in the foregoing manner a small proportion of the catalyst suspension can be drawn off from the system continuously and treated so as to eliminate the accumulating solid or waxy material. It is contemplated, however, that the removal of this accumulating material may be effected periodically as, for example, by shutting down the process and treating all of the catalyst suspension in the system by the foregoing methods. Still another method would involve periodically discontinuing carbon monoxide feed while continuing to pass hydrogen through the system under elevated temperature conditions.

Obviously many modifications and variations of the invention as above set forth may be made without departing from the spirit and scope thereof, and therefore only such limitations should be imposed as are indicated in the appended claims.

I claim:

1. In the catalytic treatment of gaseous reactants with a solid catalyst at a predetermined temperature to form products of conversion with evolution of substantial heat of reaction, the method comprising suspending the catalyst in finely divided form in a carrier liquid substantially non-vaporizable under the reaction temperature to form a slurry, introducing a stream of the slurry to the lower portion of an elongated vertical reaction zone of restricted cross-sectional area, commingling gaseous reactants with said stream in amount sufficient to lift the slurry through the reaction zone by gravity displacement, surrounding the reaction zone with a cooling liquid to remove the heat of reaction, thereby maintaining the reaction zone at the reaction temperature, removing slurry from the upper portion of the reaction zone as an overflow comprising reactants, normally liquid products of reaction and slurry, passing said overflow to a separating zone, separating gaseous constituents from said overflow, passing the liquid portion of said overflow to a fractionating zone, removing liquid products of reaction from said slurry and recycling the slurry from which products have been removed to the reaction zone.

2. In the catalytic treatment of gaseous reactants under predetermined conditions of temperature and pressure by contact with a solid catalyst to form normally liquid products of conversion with substantial evolution of heat, the method which comprises forming a slurry of the catalyst in finely divided form in a liquid substantially non-vaporizable under the conditions of reaction, maintaining a substantially static column of said slurry, the lower portion of said column being in fluid communication with the lower portion of a vertical reaction column of restricted cross sectional area, causing said slurry to flow in a continuous stream from the lower portion of said static column to the lower portion of the reaction column by gravity displacement, continuously dispersing reactant gases in said slurry stream in the lower portion of said reaction column, such that the gases force the slurry upwardly through the reaction column, heating said gases to substantially the reaction temperature prior to dispersing in the catalyst slurry stream, effecting conversion of the heated gases as they rise through the reaction column in contact with the slurried catalyst, surrounding the exterior surface of the reaction column with cooling liquid sufficient to remove exothermic heat of conversion and maintain the reaction column at said predetermined temperature, continuously removing an overflow from the upper portion of the reaction column comprising unreacted gas, liquid products of conversion and catalyst slurry, continuously passing said overflow into a separating zone wherein unreacted gases escape from the normally liquid portion of said overflow, recycling the separated gases at least in part to the lower portion of said reaction column for dispersion therein in the catalyst slurry stream, continuously passing the liquid portion of said overflow to a fractionating zone surmounting said static column and in fluid communication therewith, effecting separation of products of conversion from said slurry in the fractionating zone, discharging the separated products and continuously passing the slurry from the fractionating zone into the upper portion of the static column for return to the reaction column.

3. In the catalytic hydrogenation of carbon monoxide under predetermined conditions of temperature and pressure by contact with a hydrogenating catalyst to produce compounds containing at least two carbon atoms per molecule, the method which comprises forming a slurry of solid catalyst particles, of from about 200 to 400 mesh, in liquid substantially non-vaporizable under the reaction conditions, maintaining a substantially static column of said slurry, the lower portion of said column being in fluid communication with the lower portion of a vertical reaction column of restricted cross sectional area, causing said slurry to flow in a continuous stream from the lower portion of said static column to the lower portion of the raction column by gravity displacement, continuously dispersing carbon monoxide and hydrogen in the proportion of about one molecule carbon monoxide to two molecules hydrogen in said slurry stream in the lower portion of said reaction column such that the gases force the slurry upwardly through the reaction column, heating the carbon monoxide and hydrogen to a temperature of about 375 to 450° F. prior to dispersing in the catalyst slurry stream, effecting conversion of the heated gases as they rise through the reaction column in contact with the slurried catalyst, surrounding the exterior surface of the reaction column with cooling liquid sufficient to remove exothermic heat of conversion and maintain the reaction column at said predetermined temperature, continuously removing an overflow from the upper portion of the reaction column comprising unreacted gas, liquid products of conversion and catalyst slurry, continuously passing said overflow into a separating zone wherein unreacted gases escape from the normally liquid portion of said overflow, recycling the separated gases at least in part to the lower portion of said reaction column for dispersion therein in the catalyst slurry stream, continuously passing the liquid portion of said overflow to a fractionating zone surmounting said static column and in fluid communication therewith, effecting separation of products of conversion from said slurry in the fractionating zone, discharging the separated products and continuously passing the slurry from the fractionating zone into the upper portion of the static column for return to the reaction column.

4. In the catalytic treatment of gaseous reactants with a solid catalyst at a predetermined temperature to form products of conversion with evolution of substantial heat of reaction, the method comprising suspending the catalyst in finely-divided form in a carrier liquid substantially non-vaporizable at the reaction temperature, dispersing reactants in gas phase in the resulting suspension, continuously passing a stream of suspension containing dispersed reactants in gas phase through an elongated tubular reaction zone of restricted cross sectional area, surrounding the reaction zone with a cooling liquid in indirect heat exchange relationship with said carrier liquid to remove heat of reaction, thereby maintaining the reaction zone at substantially said predetermined temperature, continuously discharging from the reaction zone a stream comprising unreacted gas, catalyst suspension and products of reaction, separating from the discharged stream a gaseous fraction comprising unreacted gas, separately removing from said stream products of reaction and catalyst, and recycling catalyst from which products of reaction have been removed to the reaction zone, said recycled catalyst being suspended in carrier liquid.

5. In the catalytic treatment of gaseous reactants with a solid catalyst at a predetermined temperature to form products of conversion with evolution of substantial heat of reaction, the method comprising suspending the catalyst in finely-divided form in carrier liquid substantially non-vaporizable at the reaction temperature, introducing a stream of resulting suspension to the lower portion of an elongated vertical tubular reaction zone of restricted cross sectional area, dispersing reactants in gas phase in said stream in amount sufficient to lift the slurry through the reaction zone by gravity displacement, surrounding the reaction zone with a cooling liquid to remove heat of reaction, thereby maintaining the reaction zone at substantially said predetermined temperature, continuously discharging from the upper portion of the reaction zone a stream comprising unreacted gas, products of reaction, and catalyst suspension, treating the discharged stream to remove unreacted gas and products of reaction from the catalyst and recycling to the reaction zone catalyst from which products of reaction have been removed, said recycled catalyst being suspended in carrier liquid.

6. In the catalytic hydrogenation of carbon monoxide under predetermined conditions of temperature and pressure by contact with a hydrogenating catalyst to produce compounds containing at least 2 carbon atoms per molecule, the method which comprises suspending the catalyst in finely-divided form in carrier liquid substantially non-vaporizable under the reaction conditions, introducing a stream of resulting suspension to the lower portion of an elongated vertical tubular reaction zone of restricted cross sectional area, dispersing carbon monoxide and hydrogen in effective proportions in gas phase in said stream in an amount sufficient to lift the slurry through the reaction zone by gravity displacement, surrounding the reaction zone with a cooling liquid to remove heat of reaction, thereby maintaining the reaction zone at substantially said predetermined temperature, discharging from the upper portion of the reaction zone a stream comprising unreacted gas, products of reaction and suspension, treating the discharged stream to remove unreacted gas and products of reaction from the catalyst and recycling to the reaction zone catalyst from which products of reaction have been removed, said recycled catalyst being suspended in carrier liquid.

FRANK J. MOORE.

REFERENCES CITED

The following references are of record in the file of this patent:

UNITED STATES PATENTS

| Number | Name | Date |
|---|---|---|
| 1,380,067 | Koch | May 31, 1921 |
| 2,161,974 | Peck | June 13, 1939 |
| 2,250,421 | Riblett | July 22, 1941 |
| 2,287,092 | Duftschmid | June 23, 1942 |
| 2,296,696 | Babcock | Sept. 22, 1942 |
| 2,318,602 | Duftschmid | May 11, 1943 |
| 2,353,098 | Whiteley | July 4, 1944 |
| 2,389,739 | Pevere | Nov. 27, 1945 |

OTHER REFERENCES

Ser. No. 373,690, Guinot (A. P. C.), published June 13, 1943 (filed Jan. 8, 1941, now abandoned).